United States Patent
Yamazaki et al.

(10) Patent No.: US 8,095,718 B2
(45) Date of Patent: Jan. 10, 2012

(54) BRIDGE, INFORMATION PROCESSOR, AND ACCESS CONTROL METHOD

(75) Inventors: Takeshi Yamazaki, Tokyo (JP); Hideyuki Saito, Tokyo (JP); Yuji Takahashi, Tokyo (JP); Hideki Mitsubayashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 457 days.

(21) Appl. No.: 12/282,393

(22) PCT Filed: Nov. 30, 2006

(86) PCT No.: PCT/JP2006/323948
§ 371 (c)(1),
(2), (4) Date: Feb. 11, 2009

(87) PCT Pub. No.: WO2007/105343
PCT Pub. Date: Sep. 20, 2007

(65) Prior Publication Data
US 2009/0222610 A1    Sep. 3, 2009

(30) Foreign Application Priority Data

Mar. 10, 2006 (JP) ................. 2006-066789

(51) Int. Cl.
*G06F 13/00* (2006.01)
(52) U.S. Cl. .............. 710/306; 710/313; 710/316
(58) Field of Classification Search ........... 710/306, 710/310, 311, 313, 316
See application file for complete search history.

(56) References Cited

U.S. PATENT DOCUMENTS
7,096,308 B2 *  8/2006  Main et al. .............. 710/315
(Continued)

FOREIGN PATENT DOCUMENTS
JP           11-31118           2/1999
(Continued)

OTHER PUBLICATIONS
International Search Report dated Feb. 27, 2007, from the corresponding International Application.
(Continued)

*Primary Examiner* — Glenn A Auve
(74) *Attorney, Agent, or Firm* — Katten Muchin Rosenman LLP (57) ABSTRACT

A downstream port 22 of a bridge 20 connecting a processor unit and a peripheral device acknowledges access from the peripheral device via one of a plurality of downstream channels available for access by the peripheral device to a memory of the processor unit, the downstream channels being virtual channels provided for interfacing with the peripheral device. The router 24 routes the access to upstream channels each assigned a memory bandwidth available for access to the memory, the upstream channels being virtual channels supported by the processor unit. In this process, the router refers to a table storing identifiers of the downstream channels and identifiers of the upstream channels in association with each other so as to allocate to the peripheral device the upstream channel corresponding to the downstream channel used by the peripheral device, in response to the access from the peripheral device.

7 Claims, 5 Drawing Sheets

U.S. PATENT DOCUMENTS

| | | | |
|---|---|---|---|
| 7,380,018 B2 * | 5/2008 | Moll | 709/239 |
| 7,613,864 B2 * | 11/2009 | Torudbakken et al. | 710/312 |
| 7,903,558 B1 * | 3/2011 | Dropps et al. | 370/232 |
| 2002/0073431 A1 * | 6/2002 | Nikolich | 725/111 |
| 2003/0061620 A1 * | 3/2003 | Denney et al. | 725/95 |
| 2005/0038947 A1 * | 2/2005 | Lueck et al. | 710/315 |
| 2006/0294254 A1 * | 12/2006 | Emerson et al. | 709/238 |

FOREIGN PATENT DOCUMENTS

| | | |
|---|---|---|
| JP | 2005-332372 | 12/2005 |

OTHER PUBLICATIONS

Written Opinion of the International Searching Authority and an International Preliminary Report on Patentability dated Nov. 24, 2009, from the corresponding International Application.

Notification of Reason(s) for Refusal dated May 17, 2011, from corresponding Japanese Application No. 2006-066789.

* cited by examiner

| DOWNSTREAM VCID | INTERNAL BUS |
|---|---|
| 1 | 1 |
| 2 | 2 |
| 3 | 2 |
| ... | ... |

FIRST TABLE

| INTERNAL BUS | UPSTREAM VCID | RESOURCE QUOTA |
|---|---|---|
| 1 | 1 | 50% |
| 2 | 1 | 20% |
| 3 | 1 | 20% |
| 4 | 2 | 10% |
| ... | ... | ... |

SECOND TABLE

FIG.6

| INTERNAL BUS ID | ADDRESS | ... |
|---|---|---|

BRIDGE, INFORMATION PROCESSOR, AND ACCESS CONTROL METHOD

TECHNICAL FIELD

The present invention relates to a technology for allowing a peripheral device connected to a processor unit to access the processor unit.

BACKGROUND ART

Various peripheral devices are connected to a personal computer or a server via an IOIF (IO interface) or a peripheral component interconnect (PCI) bus, thereby forming an information processing system.

One approach to reduce the load imposed on a processor when a peripheral device accesses the memory of the processor is to use a direct memory access (DMA) architecture. The use of DMA allows direct access from a peripheral device to the memory of the processor.

DISCLOSURE OF THE INVENTION

Problem to be Solved by the Invention

However, the required access speed differs depending on the type of peripheral device. For example, a graphics card requires a faster access than other peripheral devices. For efficient access, access from peripheral devices to the memory of a processor should be subject to sophisticated control.

In this background, a general purpose of the present invention is to provide a technology that allows a peripheral device to access the memory of a processor efficiently.

Means to Solve the Problem

The present invention according to at least one embodiment relates to a bridge. The bridge is for connecting a processor unit and a peripheral device and comprises a downstream port and a router.

The downstream port is connected to the peripheral device and supports a plurality of downstream channels used for the access by the peripheral device, the downstream channels being virtual channels provided for interfacing with the peripheral device.

The router is operative to route access from the peripheral device to the memory of the processor unit via the downstream port, to upstream channels each assigned a memory bandwidth available for access to the memory of the processor unit, the upstream channels being virtual channels supported by the processor unit.

The router is provided with a table storing identifiers of the downstream channels and identifiers of the upstream channels in association with each other, and refers to the table so as to allocate to the peripheral device the upstream channel corresponding to the downstream channel used by the peripheral device, in response to the access from the peripheral device.

Where the router is provided with a plurality of internal buses, the table may comprise a first table operative to store the identifiers of the downstream channels and identifiers of the internal buses in association with each other, and a second table operative to store the identifiers of the internal buses and the identifiers of the upstream channels in association with each other. In response to the access from the peripheral device, the router refers to the first table to allocate to the peripheral device the internal bus corresponding to the downstream channel used by the peripheral device, and refers to the second table to allocate to the peripheral device the upstream channel corresponding to the internal bus allocated to the peripheral device.

The second table also may store resource bandwidths in the bridge respectively allocated to the internal buses, in association with the identifiers of the internal buses, and the router may refer to the second table to allocate to the peripheral device the resource bandwidth used by the accessing peripheral device.

The present invention according to another embodiment relates to an information processor. The information processor comprises a processor unit, a peripheral device, and a bridge connecting the processor unit and the peripheral device.

The bridge according to the embodiment described above may be used as the bridge of the information processor. The processor unit is provided with an access controller operative to allow the bridge to route the access, to which one of the upstream channels is allocated, to the memory of the processor unit at the memory bandwidth allocated to the upstream channel.

Optional combinations of the aforementioned constituting elements, and implementations of the invention in the form of methods, apparatuses, computer programs, recording mediums storing computer programs may also be practiced as additional modes of the present invention.

Advantage of the Present Invention

The present invention allows a peripheral device connected to a processor unit to access a memory of the processor unit efficiently.

DESCRIPTION OF THE REFERENCE NUMERALS 10 processor unit, 20 bridge, 21 downstream VC, 22 downstream port, 24 router, 28 upstream port, 29 upstream VC, 30 peripheral device, 100 PCI device, 102 IOIF, 110 bridge, 112 first input and output unit, 114 bridge controller, 115 internal bus, 116 buffer, 118 second input and output unit, 120 multicore processor, 130 SPE, 132 core, 134 local memory, 136 MFC, 138 DMAC, 140 PPE, 142 core, 144 L1 cache, 145 L2 cache, 146 MFC, 148 DMAC, 150 ring bus, 160 IOIF, 164 IO controller, 170 memory controller, 180 main memory

BEST MODE FOR CARRYING OUT THE INVENTION

Before describing the embodiment of the present invention in detail, a brief summary of the proposed technology will be given.

Figure 1:
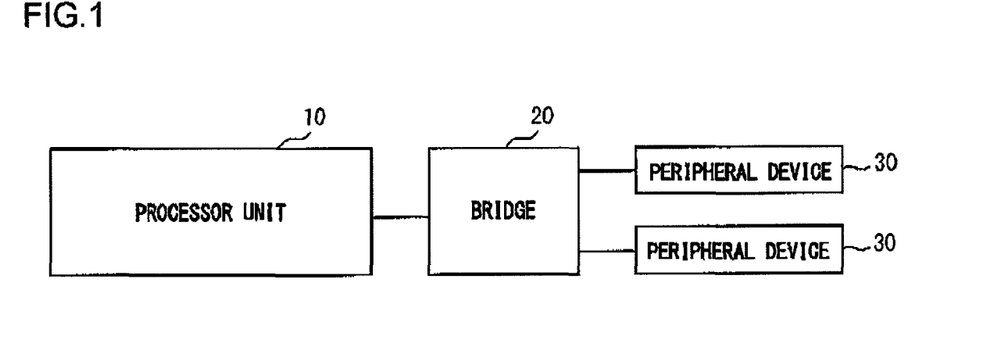
FIG. 1 shows an exemplary information processing system.

The information processing system shown in FIG. 1 will be discussed. The information processing system comprises a processor unit 10 and a plurality of (two, in the illustrated example) peripheral devices 30. The processor unit 10 and the peripheral devices 30 are connected by a bridge 20. The processor unit 10 may be a single processor system comprising a single processor or a multiprocessor system comprising a plurality of processors. The processor unit 10 is provided with a memory (not shown). In the case of a multiprocessor system, the memory is a shared memory accessible by the processors.

Figure 2:
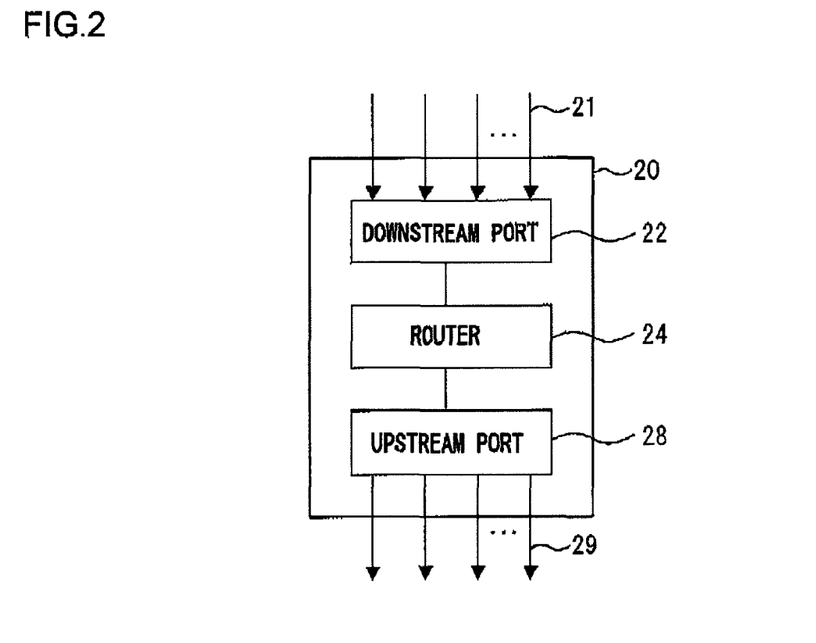
FIG. 2 shows a bridge in the information processing system shown in FIG. 1.

FIG. 2 shows the bridge 20.

The bridge 20 comprises a downstream port 22 connected to the peripheral devices 30, an upstream port 28 connected to the processor unit 10, and a router 24. The downstream port 22 supports a plurality of virtual channels (hereinafter, referred to as downstream VCs) 21 that allow the peripheral devices 30 to access the memory of the processor unit 10. The peripheral device 30 accesses the memory using one or a plurality of downstream VCs 21.

Figure 3:
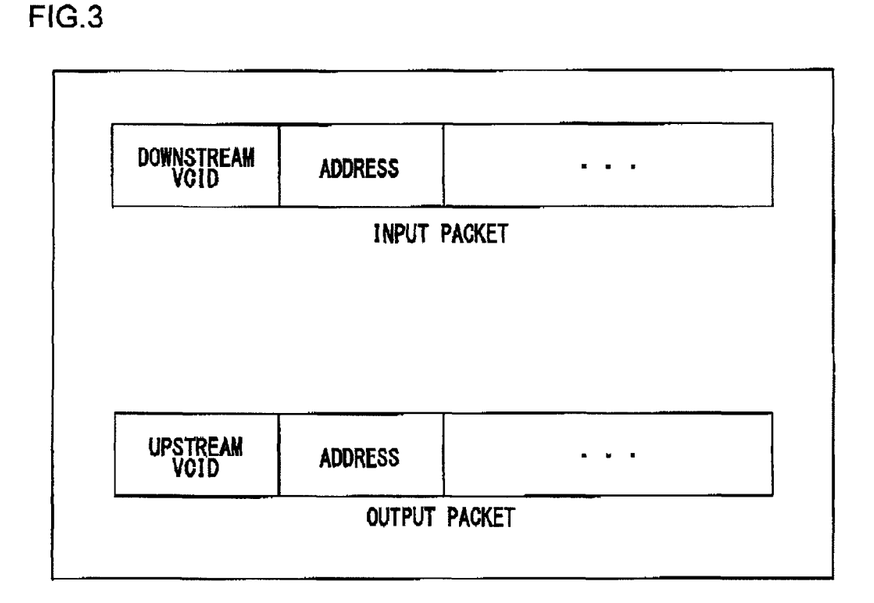
FIG. 3 shows an input packet and an output packet.

The peripheral device 30 issues an access request packet to access the memory of the processor unit 10. An access request packet can designate an address in a memory area at the destination of access by the peripheral device 30. The packet includes an identifier of the downstream VC 21 used by the issuing peripheral device 30. The upper part of FIG. 3 shows an example of access request packet (hereinafter, referred to as an input packet) issued by the peripheral device 30. A downstream VCID in the figure denotes an identifier of the downstream VC used by the accessing peripheral device 30. The address designates a location in the memory area at the destination of access.

The router 24 converts an input packet received by the downstream port 22 into an output packet shown in the lower part of FIG. 3. The output packet is output by the upstream port 28 to the processor unit 10.

As shown in the lower part of FIG. 3, an output packet comprises an upstream VCID and an address. A description will now be given of an upstream VCID.

The upstream port 28 supports a plurality of virtual channels (hereinafter, referred to as upstream VCs) 29 that allow access to the memory of the processor unit 10. The upstream VCs 29 are also supported by the processor unit 10. An upstream VCID is an identifier of the upstream VC 29.

Each upstream VC 29 is assigned a memory bandwidth used to access the memory of the processor unit 10. In other words, the output packet output by the upstream port 28 uses the upstream VCID included therein to designate one of the upstream VCs 29, thereby designating the memory bandwidth.

For "the upstream VC 29 to be assigned a memory bandwidth", correspondence between the upstream VCs 29 and the memory bandwidths may be established. Memory bandwidths may be either directly assigned or indirectly assigned. For example, where the IOIF of the processor unit 10 connected to the upstream port 28 supports a plurality of virtual channels each assigned a memory bandwidth and where the upstream VCs 29 are assigned to the virtual channels supported by the IOIF, it can be said that the upstream VCs 29 are indirectly assigned memory bandwidths.

Figure 4:
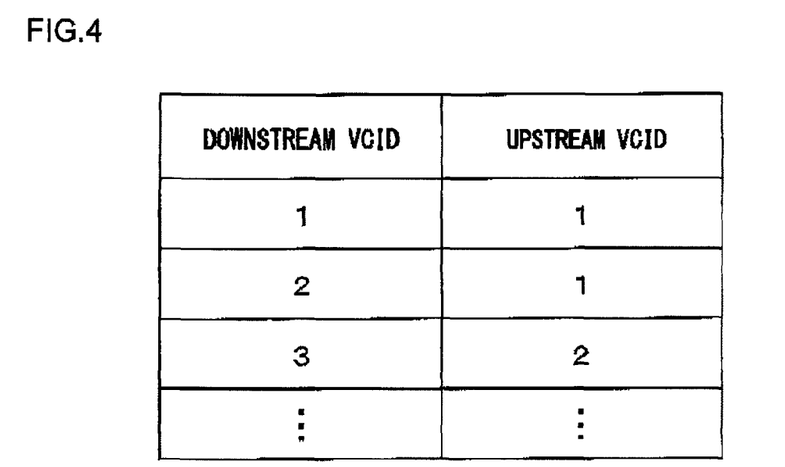
FIG. 4 shows a first exemplary table for converting an input packet into an output packet.

In converting an input packet designating the downstream VC 21 into an output packet designating the upstream VC 29, the router 24 of the bridge 20 uses a table shown in FIG. 4, for example. The table stores identifiers of the downstream VCs 21 (downstream VCIDs) and identifiers of the upstream VCs 29 (upstream VCIDs) in association with each other. The router 24 refers to the table and obtains an output packet by converting the downstream VCID included in the input packet into an upstream VCID corresponding to the downstream VCID.

The processor unit 10 is provided with an access controller (not shown). The access controller reads the upstream VCID included in the output packet, assigns a memory bandwidth corresponding to the designated upstream VC, and routes an access, thereby achieving reservation of a memory bandwidth for the access.

Thus, according to the inventive technology, it is possible to control the memory bandwidth available for access to the memory of the processor unit 10 for each peripheral device 30 (i.e., on a device by device basis). Accordingly, the memory bandwidth can be reserved depending on the type of peripheral device. For example, memory bandwidths for realtime data can be secured.

Further, since reservation is performed directly through the coordination of the bridge 20 and the access controller of the processor unit 10 and without the intervention of the CPU of the processor 10, overhead is prevented from occurring.

A consideration will be given of a case where there are a plurality of internal buses (not shown) responsible for data transfer from the downstream port 22 to the upstream port 28. In this case, the router 24 of the bridge 20 may use the table shown in FIG. 5.

Figure 5:
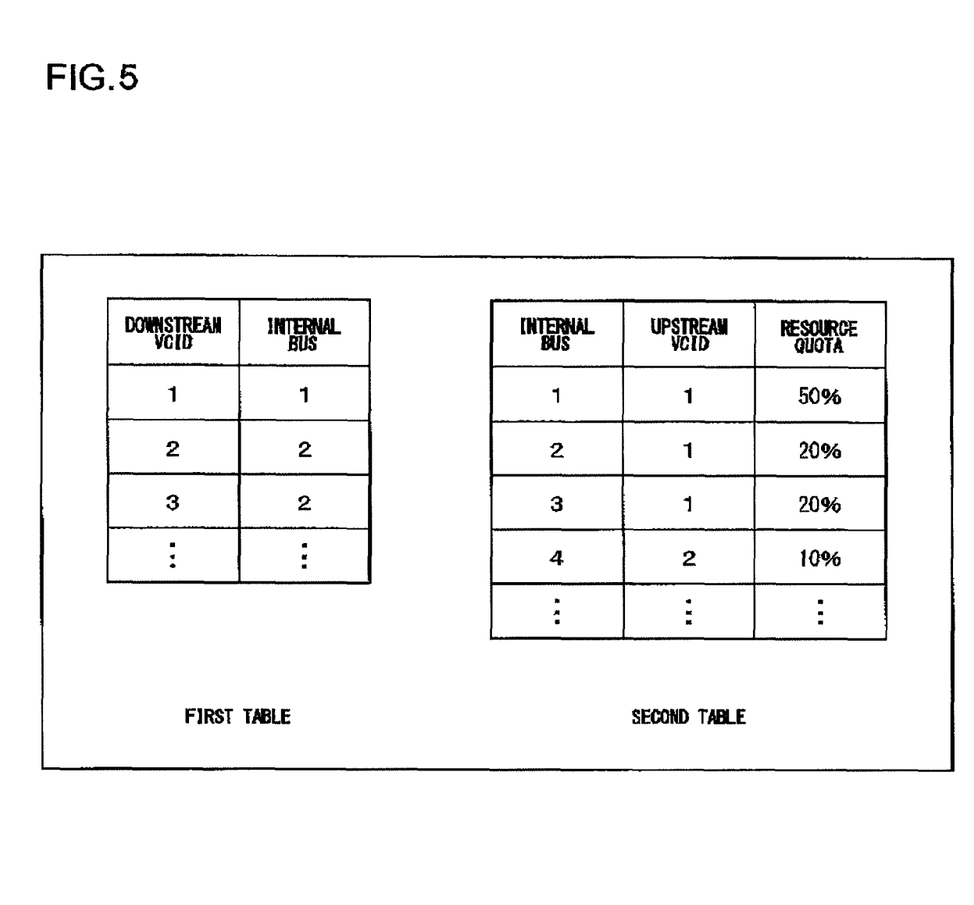
FIG. 5 shows a second exemplary table for converting an input packet into an output packet.

The table shown in FIG. 5 comprises a first table and a second table. The first table stores downstream VCIDs and identifiers of internal buses in association with each other. The second table stores identifiers of internal buses and upstream VCIDs in association with each other. The second table also stores resource quota in association with the identifiers of internal buses and the upstream VCIDs. The details will be described later.

Figure 6:
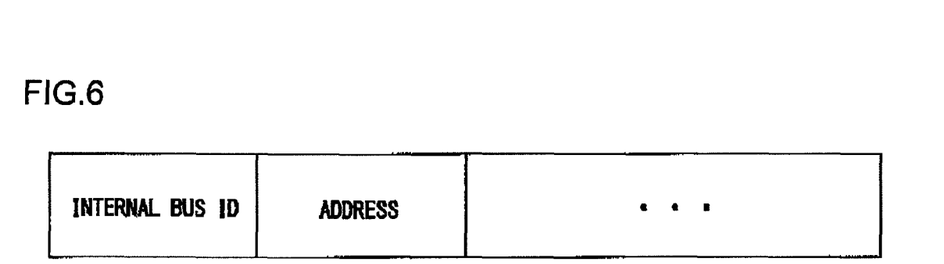
FIG. 6 shows an internal packet transferred through the internal bus of the bridge 20.

The router 24 of the bridge 20 refers to the first table so as to obtain the identifier of the internal bus corresponding to the downstream VCID included in the input packet received from the peripheral device 30 and allocate the internal bus indicated by the identifier to the access. In this process, the downstream VCID included in the input packet is converted into the identifier of the internal bus thus allocated. Hereinafter, the packet thus converted will be referred to as an internal packet. FIG. 6 shows an internal packet. Referring to FIG. 6, an internal bus ID denotes an identifier of an internal bus.

The internal packet shown in FIG. 6 is transferred to the upstream port 28 via the internal bus allocated to the internal packet, i.e., the internal bus designated by the internal bus ID included in the internal packet. The router 24 converts the internal packet into the output packet before the internal packet is output by the upstream port 28. More specifically, the router 24 refers to the second table shown in FIG. 5 and converts the internal bus ID included in the internal packet into the upstream VCID corresponding to the internal bus ID.

Thus, internal buses are allocated in accordance with downstream VCs 21 and upstream VCs 29 are allocated in accordance with internal buses. The two tables are used for packet conversion, i.e., for allocation. Combinations of tables achieve flexible setting.

We further propose configuring the bridge 20 so as to set resources (not shown) such as buffers for temporarily storing commands and data for each internal bus. More specifically, resource quota allocated to each internal bus is established as shown in the second table of FIG. 5. In the illustration, the resource quota is established for each internal bus by way of example. Alternatively, the number of entries may be established for each internal bus.

When the router 24 refers to the second table to convert an internal packet into an output packet, the router 24 also retrieves the resource quota corresponding to the internal bus ID included in the internal packet. In this way, available resources can be controlled for each internal bus. As a result, the number of output packets that can be output can be controlled for each internal bus.

The system embodying the above-mentioned features will now be described.

Figure 7:
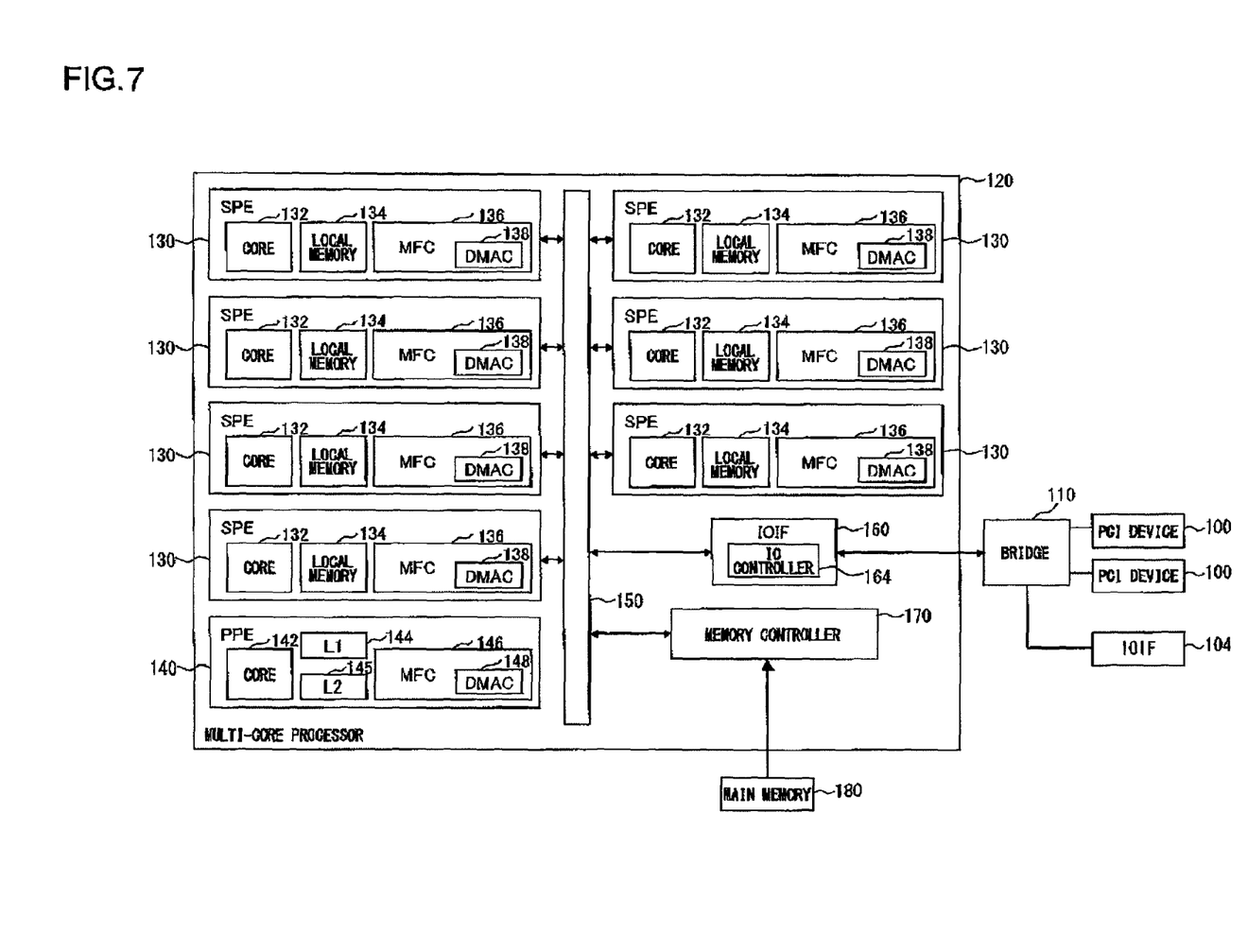
FIG. 7 shows the structure of an information processing system according to an embodiment of the present invention.

FIG. 7 shows the structure of an information processing system according to the embodiment of the present invention. The information processing system comprises a plurality of peripheral devices, a multicore processor 120, a main memory 180, and a bridge 110 connecting PCI devices 100 with the multicore processor 120. The multicore processor 120 and the main memory 180 form a single processor unit. The plurality of peripheral devices include devices connected via an IOIF 104 and the PCI devices 100.

A PCI bus is used as a connecting interface for the PCI devices 100. The PCI bus may be of a specification defined in any of PCI, PCIX, and PCI Express (registered trademark).

The bridge 100 provides a plurality of virtual channels, i.e.) downstream VCs, for interfacing with the peripheral devices. A peripheral device issues an access request packet, i.e., an input packet, to the bridge 110 using one or a plurality of downstream VCs.

The IOIF 160 of the multicore processor 120 provides a plurality of virtual channels, i.e., upstream VCs, for the bridge 110. The bridge 110 converts the input packet from the peripheral device before routing the same to one of the upstream VCs. Conversion of the input packet will be described later.

A memory controller 170 of the multicore processor 120 provides a plurality of virtual channels (hereinafter, referred to as internal VCs) for the IOIF 160. A memory bandwidth for accessing the main memory 180 is allocated to each internal VC.

The multicore processor 120 is formed as a single chip. The processor 120 comprises a main processing unit, i.e., a power processing element (PPE), 140, a plurality of (eight, in the illustrated example) sub-processing units, i.e., synergistic processing elements, 130, an IOIF 160, and a memory controller 170. These components are connected via a bus 150.

The main memory 180 is a memory shared by the processing units in the multicore processor 120 and is connected to the memory controller 170.

The memory controller 170 controls access to the main memory 180. In the example illustrated in FIG. 7, the main memory 180 is provided outside the multicore processor 120. Alternatively, the memory 180 may be provided inside the multicore processor 120.

The IOIF 160 is connected to the bridge 110 via an IOEF bus (not shown) and cooperates with the bridge 110 to enable access from the peripheral devices to the main memory 180. The IOIF 160 includes an IO controller 164.

The SPE 130 comprises a core 132, a local memory 134, and a memory flow controller (hereinafter, referred to as MFC) 136. The MFC 136 includes a direct memory access controller (DMAC) 138. Preferably, the local memory 134 is not a related-art hardware cache memory because elements for achieving the hardware cache memory functions such as a hardware cache circuit located inside or outside the chip, a cache register, and a cache memory controller are not provided.

The PPE 140 includes a core 142, an L1 cache 144, an L2 cache 145, and an MFC 146. The MFC 146 includes a DMAC 148.

Normally, the operating system (hereinafter, also referred to as OS) of the multicore processor 120 operates in the PPE 140. The basic process of the OS determines a program run on each SPE 130. The program run on the SPE 130 may be a program that forms a part of the OS (e.g., a device driver or a part of the system program). The instruction set architectures of the PPE 140 and that of the SPE 130 include different instruction sets.

Figure 8:
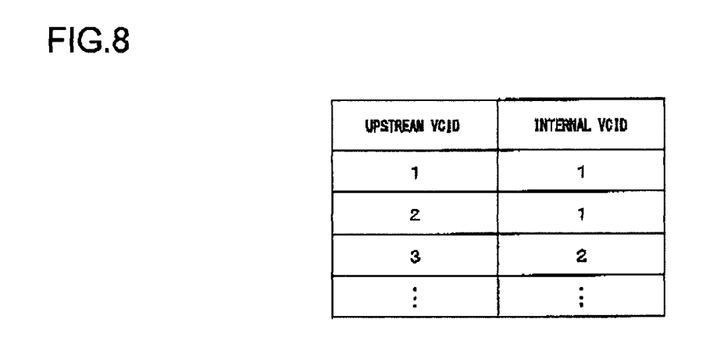
FIG. 8 shows an exemplary table for converting an upstream VCID into a downstream VCID.

At initialization of the information processing system shown in FIG. 7, the PPE 140 of the multicore processor 120 establishes a conversion table (not shown) in the IOIF 160. FIG. 8 shows an exemplary conversion table. Referring to FIG. 8, an upstream VCID denotes an identifier of a virtual channel (upstream VC) provided between the IOIF 160 and the bridge 110. An internal VCID denotes an identifier of a virtual channel (internal VC) provided by the memory controller 170. The memory controller 170 routes access to the main memory 180, using the internal VCs. At initialization, memory bandwidths are allocated to the internal VCs.

A peripheral device issues an access request packet to access the main memory 180. The input packet shown in FIG. 3 is used as the access request packet. In this embodiment, an address included in the input packet is an effective address.

An effective address indicates a location in an effective address space of the main memory 180. An effective address space is an aggregate and combination of memory space parts partitioned in the main memory 180. The multicore processor 120 uses an effective memory space as a work memory. By optimizing the internal configuration of the effective memory space, the multicore processor 120 can achieve maximum performance.

Figure 9:
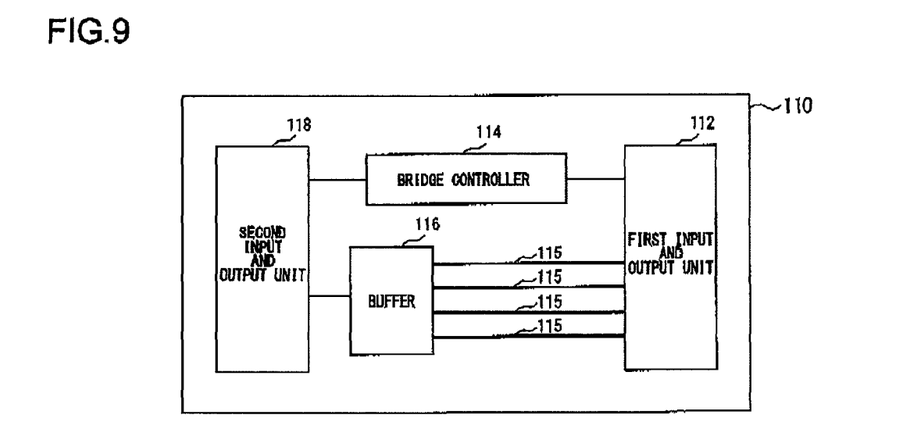
FIG. 9 shows an exemplary structure of a bridge in the information processing system shown in FIG. 7.

FIG. 9 shows the structure of the bridge 110. The bridge 110 comprises a first input and output unit 112, a bridge controller 114, a plurality of (four, in the illustrated example) internal buses 115, a buffer 116, and a second input and output unit 118.

The first input and output unit 112 receives an input packet issued by a peripheral device via a downstream VC included in the input packet. The bridge controller 114 converts the input packet into an internal packet transferred through the internal bus 115 and converts an internal packet transferred through the internal bus 115 into an output packet delivered to the second input and output unit 118. The format of an internal packet used is as shown in FIG. 6, and the format of an output packet used is as shown in FIG. 3.

An internal packet may temporarily be stored in the buffer 116 before being output by the second input and output unit 118. The second input and output unit 118 outputs a packet transferred through the internal bus 115 and converted by the bridge controller 114 to the IOIF 160 of the multicore processor 120 via the upstream VC corresponding to the upstream VCID included in the packet.

The bridge controller 114 is provided with two conversion tables (not shown) and uses the two tables to convert an input packet into an internal packet and convert an internal packet into an output packet. The tables shown in FIG. 5 are used to convert an input packet into an output packet. "Resource quota" in the second table shown in FIG. 5 corresponds in this case to quota in the buffer 116.

Figure 10:
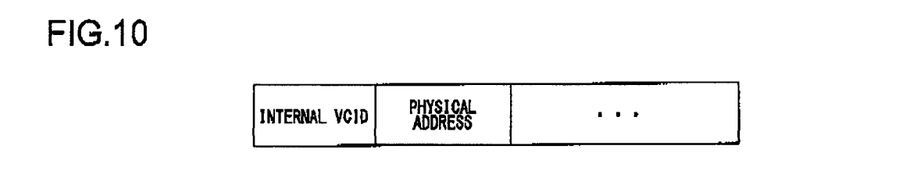
FIG. 10 shows an exemplary IOIF command.

The controller 164 of the IOIF 160 outputs the output packet delivered by the bridge 110 to the memory controller 170. In outputting the packet, the controller 164 performs two steps of conversion. In the first step, the controller 164 refers to the table shown in FIG. 8 so as to convert the upstream VCID included in the output packet into an associated internal VCID. In the second step, the controller 164 converts the effective address included in the output packet into a physical address in the main memory 180. The packet produced as a result of this conversion will be referred to as an IOIF command hereinafter. FIG. 10 shows an IOIF command.

Figure 11:
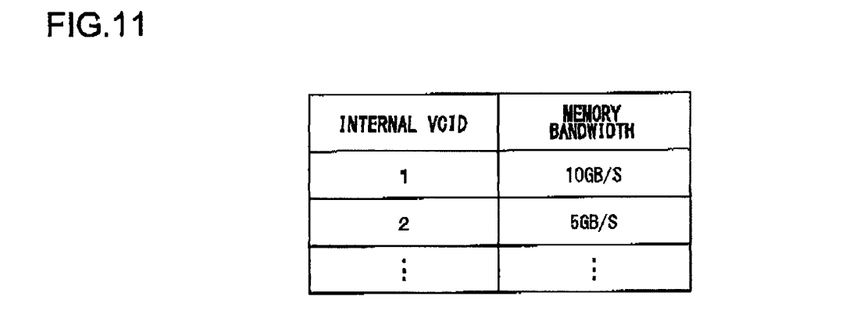
FIG. 11 shows a table mapping internal VCIDs into memory bandwidths.

The memory controller 170 routes the access to the main memory 180 according to the IOIF command thus delivered. The memory controller 170 uses the table shown in FIG. 11 configured at the time of system initialization. The table shown in FIG. 11 stores identifiers of internal VCs (internal VCIDs) and memory bandwidths allocated to the internal VCs designated by the internal VCIDs in association with each other. The memory controller 170 refers to the table to route the access at a memory bandwidth corresponding to the internal VCID included in the IOIF command. The destination of access is a location in the main memory 180 indicated by the physical address included in the IOIF command.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, peripheral devices other than the PCI devices 100 and conforming to standards other than PCI may be used in the information processing system shown in FIG. 7.

INDUSTRIAL APPLICABILITY

The present invention is applicable to a bridge connecting a processor and peripheral devices.

The invention claimed is:

1. A bridge for connecting a processor unit and a peripheral device, comprising:
   a downstream port connected to the peripheral device; and
   a router operative to route access from the peripheral device to a memory of the processor unit via the downstream port, to upstream channels each assigned a memory bandwidth available for access to the memory of the processor unit, the upstream channels being virtual channels supported by the processor unit, wherein
   the downstream port supports a plurality of downstream channels used for the access by the peripheral device, the downstream channels being virtual channels provided for interfacing with the peripheral device, and
   the router is provided with a table storing identifiers of the downstream channels and identifiers of the upstream channels in association with each other, and refers to the table so as to allocate to the peripheral device the upstream channel corresponding to the downstream channel used by the peripheral device, in response to the access from the peripheral device.

2. The bridge according to claim 1, wherein
the router is provided with a plurality of internal buses, the table comprises:
   a first table operative to store the identifiers of the downstream channels and identifiers of the internal buses in association with each other; and
   a second table operative to store the identifiers of the internal buses and the identifiers of the upstream channels in association with each other, and
   in response to the access from the peripheral device, the router refers to the first table to allocate to the peripheral device the internal bus corresponding to the downstream channel used by the peripheral device, and refers to the second table to allocate to the peripheral device the upstream channel corresponding to the internal bus allocated to the peripheral device.

3. The bridge according to claim 2, wherein
the second table stores resource bandwidths in the bridge respectively allocated to the internal buses, in association with the identifiers of the internal buses, and
the router refers to the second table to allocate to the peripheral device the resource bandwidth used by the accessing peripheral device.

4. An information processor comprising:
a processor unit;
a peripheral device; and
a bridge connecting the processor unit and the peripheral device, wherein
the bridge comprises:
a downstream port connected to the peripheral device; and
a router operative to route access from the peripheral device to a memory of the processor unit via the downstream port, to upstream channels each assigned a memory bandwidth available for access to the memory of the processor unit, the upstream channels being virtual channels supported by the processor unit, wherein
the downstream port supports a plurality of downstream channels provided used for the access by the peripheral device, the downstream channels being virtual channels provided for interfacing with the peripheral device,
the router is provided with a table storing identifiers of the downstream channels and identifiers of the upstream channels in association with each other, and refers to the table so as to allocate to the peripheral device the upstream channel corresponding to the downstream channel used by the peripheral device, in response to the access from the peripheral device, and
the processor unit is provided with an access controller operative to route the access, to which one of the upstream channels is allocated, to the memory at the memory bandwidth allocated to the upstream channel.

5. The information processor according to claim 4, wherein
the router is provided with a plurality of internal buses
the table comprises:
a first table operative to store the identifiers of the downstream channels and identifiers of the internal buses in association with each other; and
a second table operative to store the identifiers of the internal buses and the identifiers of the upstream channels in association with each other, and
in response to the access from the peripheral device, the router refers to the first table to allocate to the peripheral device the internal bus corresponding to the downstream channel used by the peripheral device, and refers to the second table to allocate to the peripheral device the upstream channel corresponding to the internal bus allocated to the peripheral device.

6. The information processor according to claim 5, wherein
the second table stores resource bandwidths in the bridge respectively allocated to the internal buses, in association with the identifiers of the internal buses, and
the router refers to the second table to allocate to the peripheral device the resource bandwidth used by the accessing peripheral device.

7. An access control method using a bridge connecting a processor unit and a peripheral device, comprising:
acknowledging access from the peripheral device via one of a plurality of downstream channels available for the peripheral device to access a memory of the processor unit, the downstream channels being virtual channels provided between the bridge and the peripheral device;
routing the access to upstream channels each assigned a memory bandwidth available for access to the memory of the processor unit, the upstream channels being virtual channels supported by the processor unit, wherein
the routing refers to a table storing identifiers of the downstream channels and identifiers of the upstream channels in association with each other, so as to allocate to the peripheral device the upstream channel corresponding to the downstream channel used by the peripheral device, in response to the access from the peripheral device.

* * * * *